(12) United States Patent (10) Patent No.: US 8,867,121 B2
Lavrentovich et al. (45) Date of Patent: Oct. 21, 2014

(54) METHODS AND APPARATUS FOR CONTROLLING DISPERSIONS OF NANOPARTICLES

(75) Inventors: Oleg D. Lavrentovich, Kent, OH (US); Andrii B. Golovin, Kent, OH (US)

(73) Assignee: Kent State University, Kent, OH (US)

( * ) Notice: Subject to any disclaimer, the term of this patent is extended or adjusted under 35 U.S.C. 154(b) by 715 days.

(21) Appl. No.: 12/587,731

(22) Filed: Oct. 13, 2009

(65) Prior Publication Data

US 2011/0085229 A1 Apr. 14, 2011

(51) Int. Cl.
*G02F 1/29* (2006.01)

(52) U.S. Cl.
USPC .......................................................... 359/315

(58) Field of Classification Search
USPC .......... 359/296, 900, 315, 237, 245; 345/107, 345/105; 430/32, 34, 38; 204/450, 600
See application file for complete search history.

(56) References Cited

U.S. PATENT DOCUMENTS

| | | | | |
|---|---|---|---|---|
| 5,177,475 A | * | 1/1993 | Stephany et al. | 345/96 |
| 5,184,233 A | * | 2/1993 | Lim et al. | 349/166 |
| 5,708,525 A | * | 1/1998 | Sheridon | 359/296 |
| 6,144,361 A | * | 11/2000 | Gordon et al. | 345/107 |
| 7,034,987 B2 | * | 4/2006 | Schlangen | 359/296 |
| 7,145,626 B2 | * | 12/2006 | Miller et al. | 349/166 |
| 7,179,535 B2 | * | 2/2007 | Fisher | 428/437 |
| 7,230,751 B2 | * | 6/2007 | Whitesides et al. | 359/296 |
| 2007/0195399 A1 | * | 8/2007 | Aylward et al. | 359/296 |
| 2008/0024792 A1 | | 1/2008 | Pendry et al. | |
| 2008/0165442 A1 | | 7/2008 | Cai et al. | |
| 2008/0289965 A1 | | 11/2008 | Engheta et al. | |
| 2010/0110559 A1 | | 5/2010 | Cai et al. | |

OTHER PUBLICATIONS

Canadian Military Heritage, Jun. 20, 2004, website accessed on Jun. 13, 2009 at http://www.cmhg-phmc.gc.ca/cmh/en/image_484.asp.*
Wenshan Cai et al., Optical Cloaking with Metamaterials, Letters, Nature Photonics, Apr. 2007, pp. 224-227, vol. 1, Nature Publishing Group.
Ulf Leonhardt et al., Optical Conformal Mapping, Science, Jun. 2006, pp. 1777-1780, vol. 312.
Andrii B. Golovin et al., Electrically Reconfigurable Optical Metamaterial based on Colloidal Dispersion of Metal Nanorods in Dielectric Fluid, Applied Physics Letters, Dec. 2009, pp. 254104-1-254104-3, vol. 95.
Tolga Ergin et al., Three-Dimensional Invisibility Cloak at Optical Wavelengths, Sciencexpress Report, Mar. 2010, pp. 1-7.

(Continued)

*Primary Examiner* — Tuyen Tra
(74) *Attorney, Agent, or Firm* — Hahn Loeser + Parks LLP; Scott M. Oldham, Esq.

(57) ABSTRACT

Electrically reconfigurable metamaterial with spatially varied refractive index is proposed for applications such as optical devices and lenses. The apparatus and method comprises a metamaterial in which the refractive indices are modified in space and time by applying one or more electric fields. The metamaterials are electrically controllable and reconfigurable, and consist of metal (gold, silver, etc.) particles of different shapes, such as rods, with dimension much smaller than the wavelength of light, dispersed in a dielectric medium. The metamaterial is controlled by applying a non-uniform electric field that causes two effects: (1) It aligns the metallic anisometric particles with respect to the direction of the applied electric field and (2) It redistributes particles in space, making their local concentration position dependent.

35 Claims, 14 Drawing Sheets

(56) References Cited

OTHER PUBLICATIONS

Igor I. Smolyaninov et al., Anisotropic Metamaterials Emulated by Tapered Waveguides: Application to Optical Cloaking, Physical Review Letters, May 2009, pp. 213901-1-213901-4, PRL 102.

D. Schurig et al., Metamaterial Electromagnetic Cloak at Microwave Frequencies, Science, Nov. 2006, pp. 977-980, vol. 314.

J. B. Pendry et al., Controlling Electromagnetic Fields, Science, Jun. 2006, pp. 1780-1782, vol. 312.

Jason Valentine et al., An Optical Cloak Made of Dielectrics, Nature Materials, Letters, Apr. 2009, pp. 1-4.

* cited by examiner

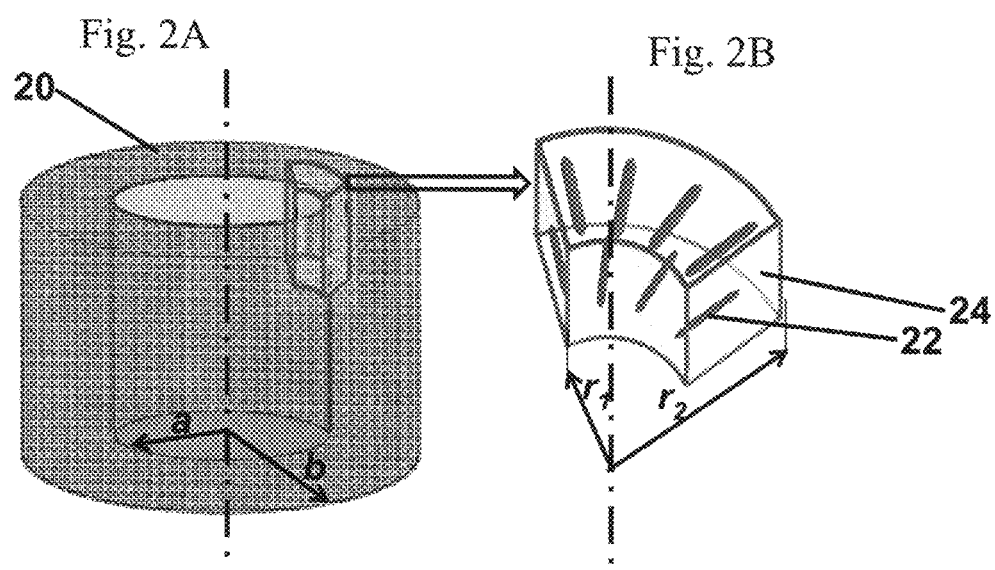
Prior Art

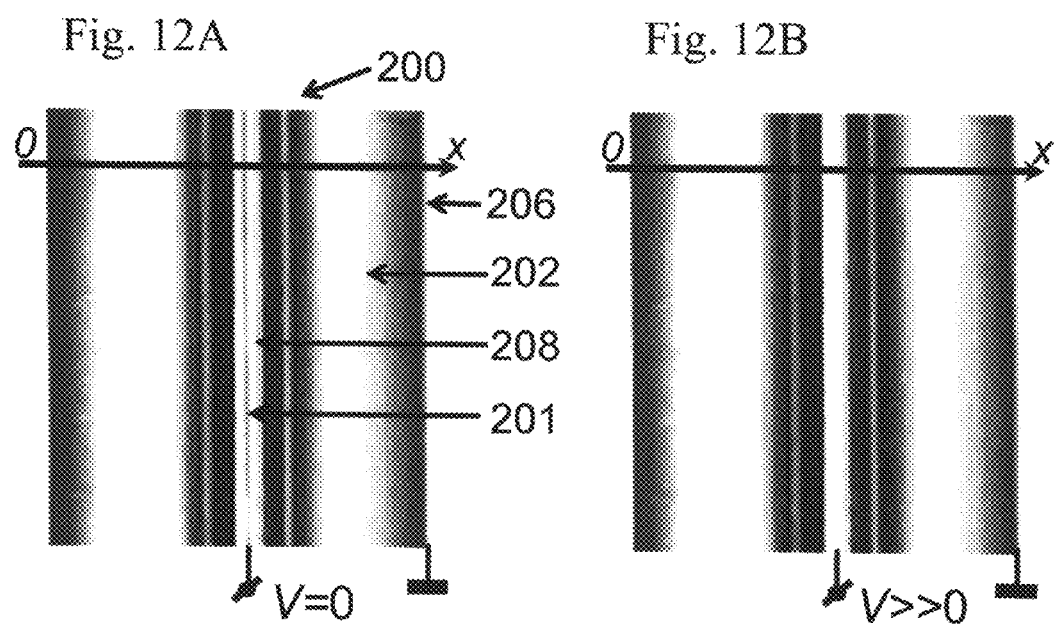

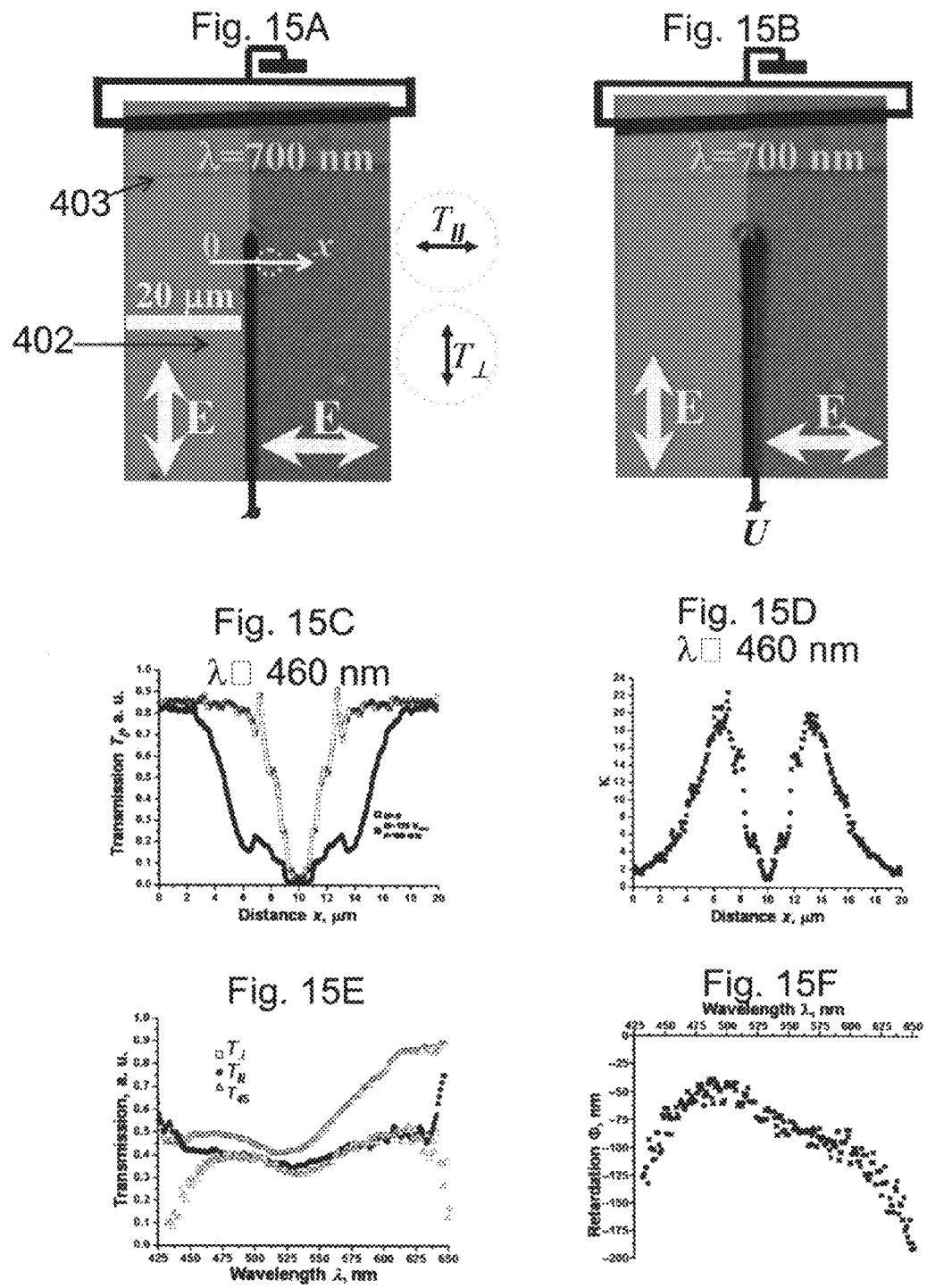

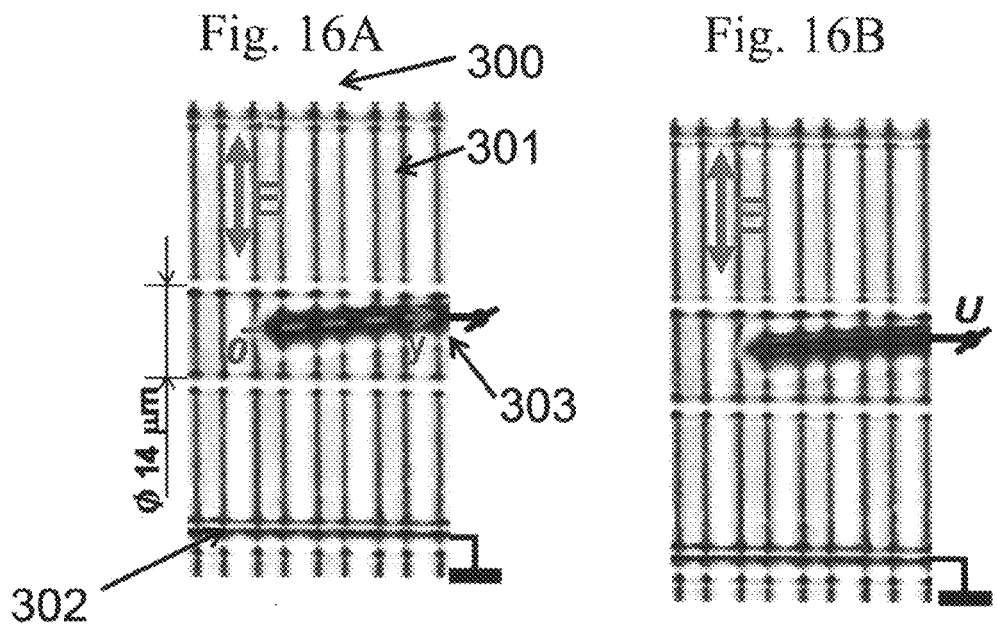
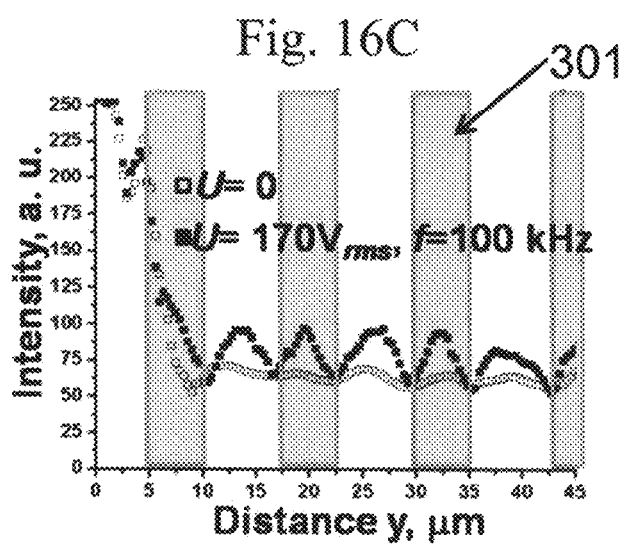

METHODS AND APPARATUS FOR CONTROLLING DISPERSIONS OF NANOPARTICLES

GOVERNMENT RIGHTS

The United States Government has a paid-up license in this invention and may have the right in limited circumstances to require the patent owner to license others on reasonable terms as provided for by the terms of Grant MURI/AFOSR #FA9550-06-1-0337 and DE-FG02-06ER46331 awarded by the U.S. Department of Energy.

TECHNICAL FIELD

There are provided methods and systems providing electrically controlled metamaterials, for transformative optics applications, such as optical cloaking and lensing as examples. Descriptions of examples of an apparatus and methods of creating spatial gradients of the refractive index are provided. The metamaterials with spatial gradients of the refractive index are formed by metal nano-particles dispersed in a dielectric medium. A non-uniform electric field controls the spatial distribution of concentration and orientation of the particles. Such a material can be used in a variety of applications, such as optical cloaking wherein an object to be cloaked is surrounded by a metamaterial shell with spatial gradients of the refractive index. For an observer outside the shell, the appearance of the object is altered and the object cannot be observed, while the background appears unobstructed. The optical metamaterials of the invention allow reconfigurable patterns of refractive indices for various possible applications, such as optical cloaking, optical lensing and other systems to control electromagnetic radiation.

BACKGROUND

Efforts have been made to develop optical metamaterials for manipulation of optical waves by propagating them through metamaterials with spatially varying refractive indices, including the cases when the refractive indices are less than 1 or even negative. These metamaterials can be used in applications such as optical cloaking and optical lensing. In the cloaking application, the invisibility sought may be partial at a specific frequency, or over a broader band of frequencies. The cloaking is designed to decrease scattering of electromagnetic wave on an object contained within a space, including "back scattering" by the object and also reducing its shadow ("forward scattering"). If both, back and forward, scatterings are reduced, the combination of the cloak and the object contained therein has a resemblance to free space. When the phrase "cloaking" or the like, is used herein, the effect may be that the object may not be visible or may appear in a distorted or attenuated form, or the background obscured by the object may be distorted or partially obscured. Several known methods exist which attempt to achieve electromagnetic concealment of objects. For example, it is possible to use a series of cameras to project an image to an observer of what he would see if an object in question were not blocking his view path. As a result, the observer does not realize that the object is present. This method, however, relies on the use of active components, and depends heavily on the relative positioning of the object, cameras and observer at all times.

There have also been efforts at preventing the detection of an object using "stealth" technology, where the objective is to make the object as invisible as possible in the reflection or back scattering direction. One means of doing this is to match the impedance of the stealth material to that of the electromagnetic wave at the boundary, but where the material is strongly attenuating to the electromagnetic waves. In this way, the energy backscattered from the object within the stealth material is strongly attenuated on reflection, and there is minimal electromagnetic reflection at the boundary within the design frequency range. This is typically used in evading radar in military applications. Shadowing may not be a consideration in stealth technology. In order to exploit electromagnetism, materials are commonly used to control and direct the electromagnetic fields. For example, a glass lens in a camera directs the rays of light to form an image, metal cages are used to screen sensitive equipment from electromagnetic radiation, and various forms of "black bodies" are utilized to prevent unwanted reflections. Although such structures can provide a reduced or altered electromagnetic signature, because they involve either the scattering of incident waves away from the target or absorbing incident waves, the objects which they hide are still detectable in transmission.

More recently, there have been efforts to conceal objects by the use of materials referred to as "metamaterials", which are composite materials that display properties beyond those available in naturally occurring materials. Typically, metamaterials are constructed with two or more materials on the microscopic (sub-micron for optical applications) level, that exhibit a refractive index with a value that is smaller than 1, zero, or negative. Metamaterials with spatially varying refractive index might be used to form optical cloaking devices. The inhomogeneous 2D or 3D patterns of refractive index in such material may cause the electromagnetic radiation incident thereon to bend in a controlled manner so that so it flows around a "hidden" object inside, such that the object becomes invisible. There is a special trajectory of light which avoids objects by propagating around them and returning to their original direction with undisturbed wave-fronts, which may be referred to as an optical cloak.

Metamaterials may also be useful in other systems to control electromagnetic radiation. As the electromagnetic radiation propagates by taking a shortest optical path given by product of the geometrical distance and the local refractive index of the medium, materials with complex and/or reconfigurable distribution of refractive indices offer an opportunity to control light by using specific patterns of the refractive indices, for example, gradients of the refractive indices may focus or defocus light beams by bending their trajectories.

Therefore, there is a need to create an optical metamaterials which allow one to create and control the spatial pattern of refractive indices.

SUMMARY

The present invention generally comprises systems and methods to make electrically reconfigurable optical elements with local refractive indices varying in space and time. The optical elements include an optical medium comprised of metallic nano-particles dispersed in a dielectric medium. The position and orientation of nano-particles are controllable and reconfigurable by the application of at least one electric field. The modifications of the position and orientation of the metallic nano-particles modify the local value of the dielectric permittivity of the metamaterial, thus modifying the optical refractive index or indices (if the orientational order of nanoparticles leads to birefringence). By creating and controlling the spatial configuration of the refractive index or indices, various optical effects can be produced and controlled. Optical systems without (or with highly suppressed) light scattering and diffraction may be produced. The invention relates to electrically controllable and reconfigurable metamaterials which are comprised of metal (gold, silver, etc.) particles of different shapes, such as rods, dispersed in a dielectric medium, for example, fluids such as water, toluene, oil, glycerine, thermotropic liquid crystal, lyotropic liquid crystal, polymer, elastomer, and other suitable materials. The surface of the particles may be functionalized to prevent their aggregation, for example, by surfactants, polymers, etc. The metamaterial is controlled by applying at least one electric field, such as a non-uniform electric field that causes at least two effects: (1) It aligns the metallic anisometric particles with respect to the direction of the applied electric field and (2) It redistributes particles in space, making their local concentration position dependent. Both effects modify the local value of the dielectric permittivity of the metamaterial, thus modifying its effective optical refractive index. The invention can be extended to systems and methods wherein the refractive indices of the material can be frozen and made permanent by, for example, polymerization of the dispersive medium.

The invention is directed to systems and methods to provide an electrically controlled optical medium with local refractive indices varying in space and/or time. The medium is comprised of a dispersion of metallic particles of various shapes (such as rods) in various dielectric media (isotropic fluids, liquid crystals, polymers), whose position and orientation are controlled by at least one externally applied electric field. By creating and controlling the spatial configuration of the refractive indices, the systems and methods can achieve various optical effects, such as lensing and cloaking. In the latter case, the developed material can bend light around a physical object thus making it invisible or nearly invisible to an observer, shadow-less or nearly shadow-less.

BRIEF DESCRIPTION OF THE DRAWINGS

FIGS. 2A and 2B show a model of an optical cloak for a specific wavelength of light in a prior art theory;

FIG. 12A shows an image captured by using an optical setup as shown in FIG. 11 with no applied voltage according to an example of the invention;

FIG. 12B shows an image captured by using an optical setup as shown in FIG. 11 with an applied voltage on according to an example of the invention;

FIG. 15A shows textures of flat cell captured in field free state by using monochromatic light with wavelength 700 nm; the cell was placed between parallel polarizers in a polarizing microscope according to this example of the invention;

FIG. 15B shows textures of flat cell captured with applied voltage on by using a monochromatic light with wavelength 700 nm; the cell was placed between parallel polarizers in a polarizing microscope according to this example of the invention;

FIG. 15C shows plots of transmission vs. distance OX measured from the flat cell of FIGS. 15A and 15B by using a monochromatic light with wavelength 460 nm; the cell was placed between parallel polarizers in a polarizing microscope according to this example of the invention;

FIG. 15D shows plots of parameter κ vs. distance OX measured from the flat cell of FIGS. 15A and 15B by using a monochromatic light with wavelength 460 nm; the cell was placed between parallel polarizers in a polarizing microscope according to this example of the invention;

FIG. 15E shows plots of transmissions vs. wavelength measured from a small area of the flat cell of FIGS. 15A and 15B shown as a dashed circle near electrode 402 in FIG. 15A according to this example of the invention;

FIG. 15F shows plots of induced phase retardation vs. wavelength calculated from data depicted in FIG. 15E according to this example of the invention;

FIG. 16A shows images of a semitransparent pattern placed in optical path of a polarizing microscope beneath of sample with the cloaking shell around metal wire in field free state according to another example of the invention;

FIG. 16B shows images of a semitransparent pattern placed in optical path of a polarizing microscope beneath of sample with the cloaking shell around metal wire with applied voltage on according to an example of the invention; and FIG. 16C shows plot of intensities vs. distance OY measured for the semitransparent pattern of stripes placed in optical path of a polarizing microscope beneath of sample with the cloaking shell around metal wire according to an example of the invention.

DETAILED DESCRIPTION OF THE DRAWINGS

Figure 1:
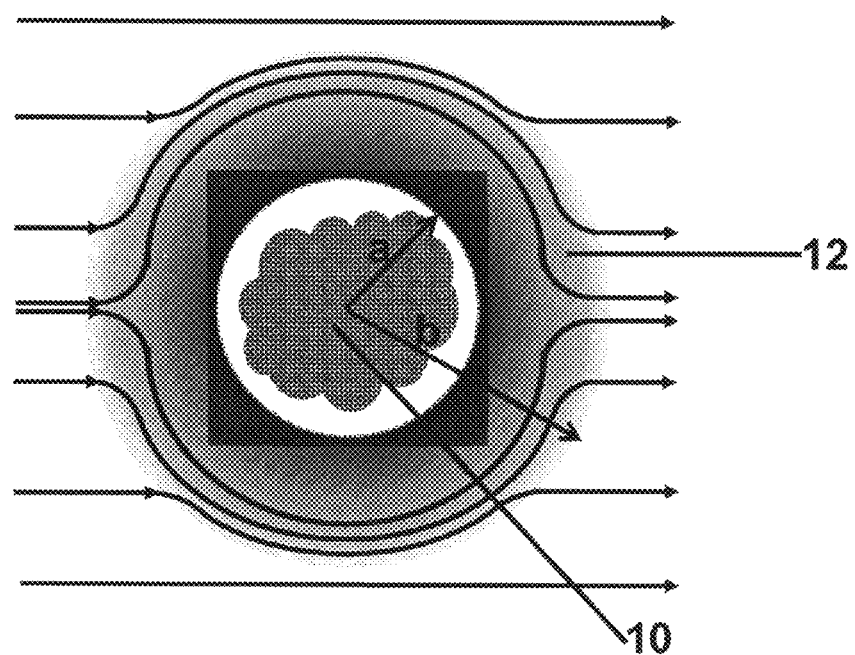
FIG. 1 shows a cross-sectional view of a cloak for an object.

With reference now to the drawings, and in particular to FIG. 1, there is shown the principle of constructing an optical metamaterial with spatially varying refractive index that is controlled by a non-uniform electric field. As seen in FIG. 1, a metamaterial shell 12 is formed around an object 10. The refractive index distribution within the shell can be designed in such a way that the light rays from the source outside the shell avoids the object 10 by propagating around the object and returning to their original direction restoring initial wavefront. For an observer outside the shell, the object will be invisible, as has been predicted theoretically. In FIG. 1, the ray tracing is depicted schematically, and assumes that the radius of the cloak 12, b is much larger than the wavelength of light, and extends around the object 10 concealed inside a circle with radius a.

There have been discussed cloaking structures designed to cloak objects from microwave radiation at 8.5 GHz for example, but generally known natural materials do not demonstrate the capability of optical cloaking in light visible to human eye, where wavelengths range is from 380 to 760 nm.

A cloaking metamaterial (artificial material) designed to cloak an object at a visible wavelength has been theorized by V. M. Shalaev and co-authors in "*Optical Cloaking with Metamaterials*", *Nature Photonics*, 1, p. 224 (2007) as shown in FIG. 2A, where a cylindrical shell 20 is forming a cloak around an object with a size smaller than the radius of the inner surface of the cylindrical shell a. A small fraction of the shell 20 is depicted in FIG. 2B, where metal wires 22 are placed in a dielectric matrix 24. In theory, the cylindrical shell 20 features silver nano-wires of specific size, diameter d=6 nm and length l=71 nm, placed inside a dielectric material. The metal wires are oriented radially. Their filling factor is high near the inner surface and low near the outer surface of the cylindrical shell, so that the refractive index of the metamaterial changes from 0 at the inner surface to 1 at the outer surface. The refractive index that changes from 0 to 1 is the "extraordinary" refractive index, characterizing propagation of light with polarization perpendicular to the axis of cylindrical shell. This refractive index is determined by the radial component of the dielectric permittivity at optical frequencies that increases from $\epsilon_r(a)=0$ to $\epsilon_r(b)=1$ with the radial coordinate. The polar component $\epsilon_\theta(r)$ of the dielectric permittivity of the metamaterial remains independent of the radial coordinate, $\epsilon_\theta(r)=Const$. According to the theory, a linearly polarized plane wave of visible light (wavelength 633 nm) propagates around the object with minimum wave-front distortions and scattering. The shell's dimension ratio used in simulations is $$\frac{a}{b} \approx 0.3.$$

Other material parameters used in calculations are $\epsilon_r(a)=0$, $\epsilon_r(b)=1$, $\epsilon_\theta=2.4$, and $\mu_z=1.0$. The calculated size of the cloak shell was small (just six times larger than the operational wavelength, $2b \approx 4$ μm). The practical challenge is how to arrange the system of nanorods in a manner needed for the theoretically predicted optical effect. In contrast, the present invention describes systems and methods according to examples, wherein an approach is based on the application of a spatially non-uniform electric field that controls concentration and orientation of metal nanorods in a dielectric medium.

In general, according to the examples of the invention, there is provided apparatus and methods of creating an optical metamaterial with spatially varying refractive index that is controlled by the application of at least one electric field, such as a nonuniform electric field. As an example, a cylindrical shell can be created between two co-axial transparent electrodes filled with a metamaterial that represents a dispersion of elongated metal particles, such as rods, dispersed in a dielectric medium. Without an applied electric field, the nanoparticles are distributed randomly and the refractive index within the shell is uniform. A voltage applied to the pair of electrodes creates a spatially non-uniform electric field that is stronger at the inner electrode than at the outer electrode. The metal nanoparticles, being more polarizable than the dielectric host, will migrate towards the inner electrode, aligning themselves parallel to the electric field lines, i.e., radially. Their filling factor will be high near the inner electrode than near the outer electrode. Thus, one may orient and distribute the metal nano-particles within a cavity between co-axial electrodes in such a way that the dielectric permittivity, magnetic permeability, and hence the refractive index of the metamaterial can be varied along the radial coordinate, in a reconfigurable manner. If the refractive index changes in a predetermined manner described in the theory by V. M. Shalaev et al., from 0 at the inner surface to some value that matches the refractive index of the environment in which the observer is located, this configuration can produce an optical cloaking effect for light polarized normally to the axis of shell. For any other non-uniform distribution of the refractive index, the shell would produce a lensing effect.

The optical metamaterial with non-uniform refractive index according to an example of the invention may be realized by using metal nano-size particles dispersed in a soft matter dielectric. The nano scale of the particles helps to mitigate scattering of light on them. In principle, the particles might be of practically any shape, from spheres to rods or exhibit even less symmetric shape. The magnitude of the dielectrophoretic force that drives the particles in the gradient electric field, however, would be very different for spheres and other shapes. Elongated rods represent an effective shape, as in this case the dielectrophoretic forces are strongly enhanced as compared to the forces acting on spherical particles, for example. Noble metals of high electrical conductivity, such as gold, silver, platinum, might be used, but other suitable materials may also be used. When the methods of the invention are applied to other devices, such as to provide a lensing effect, they offer a number of advantages, such as providing a controllable and broad variation of the refractive index (or indices) in space and time. The invention provides the ability to predictably and reconfigurably distribute the metal nanoparticles of a particular shape in space such that the effective index of refraction creates a predetermined pattern with predetermined optical properties for a particular application. The metal nanoparticles in the dielectric fluid may be electrically charged or electrically neutral. Fluids of low dielectric permittivity and low electrical conductivity, such as de-ionized water, toluene, oil, glycerine, thermotropic liquid crystal, lyotropic liquid crystal, polymer, elastomer, or other suitable fluids may be used in designs and examples according to the invention, as the soft matter dielectrics.

In accordance with examples, the nanoparticles are dispersed in the dielectric material in a predetermined manner. To keep the metal nanoparticles well dispersed and to avoid their aggregation in the dielectric media, the nanoparticles may be functionalized, e.g. by covering their surfaces with surfactants, polymers, or other suitable materials. To obtain a desired dispersion of the nanoparticles in the dielectric fluid in a predetermined manner, processes such as the use of magnetic spinners, mechanical shakers, ultrasound waves or other suitable processes may be used.

Figure 3A:
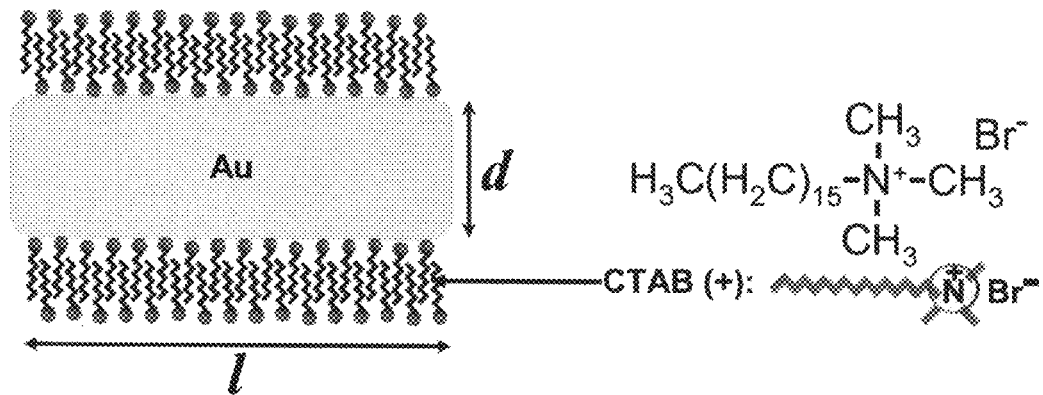
FIG. 3A shows a gold nano-rod covered with a CTAB and the molecular structure of the CTAB, according to an example of the invention.
Figure 3B:
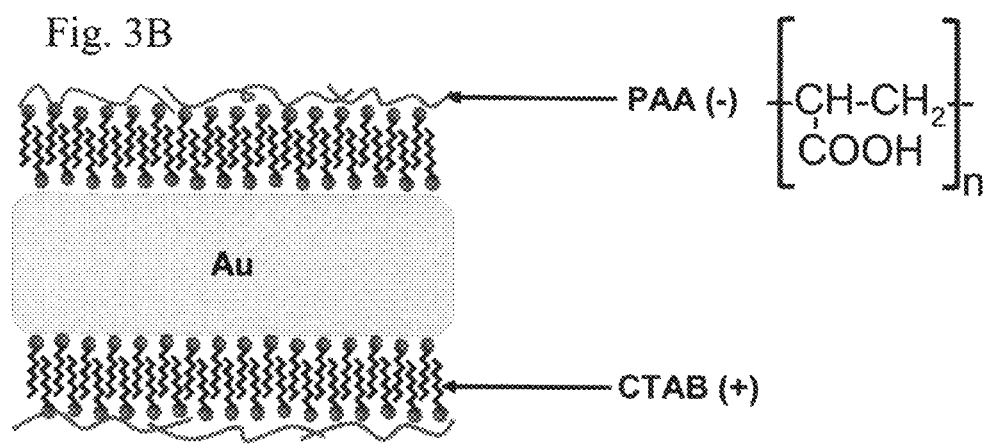
FIG. 3B shows a gold nano-rod covered with a PAA bound to a CTAB and the molecular structure of the PAA, according to an example of the invention.
Figure 4:
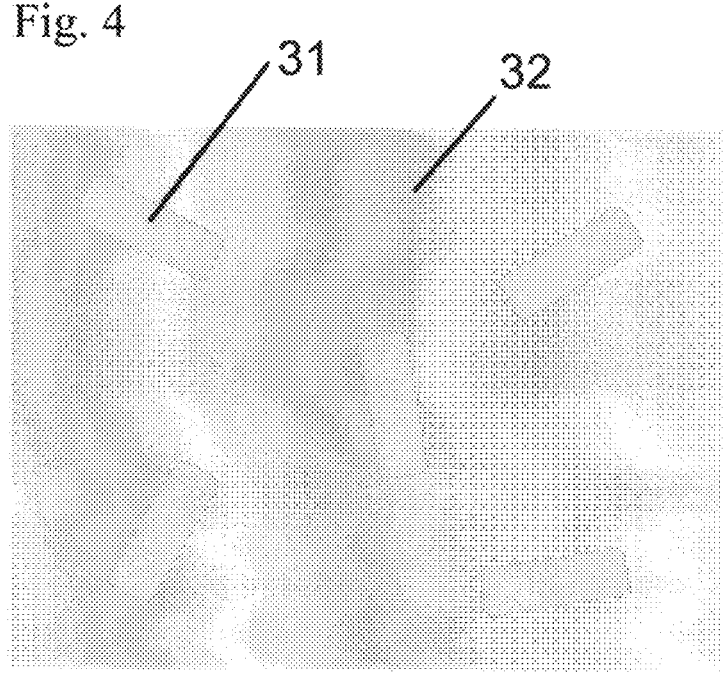
FIG. 4 shows schematic picture of gold nano-rods dispersed in water according to an example of the invention.

In an example, the nanoparticles may be gold nano-rods formed by seed mediated growth. Water based mixtures of the gold nano-rods are commercially available, for example from Nanopartz, a division of Concurrent Analytical Inc, Salt Lake City, Utah, USA. In the process of preparation, the gold nano-rods grow inside the micelles formed by aqueous solution of a cationic surfactant Cetrimonium bromide ($(C16H33)N(CH3)3Br$), called CTAB. After gold nano-rods reach the desirable length l and diameter d, they are separated from an aqueous solution of the cationic surfactant, for example, by centrifuging. Desirable concentration of nano-rods may be reached by adding de-ionized water. As a result, gold nano-rods in water solution come covered with positively charged layer of CTAB, as schematically shown in FIG. 3A. A negatively charged gold nano-rod may be formed by using a Poly(acetylene acid) (PAA) that binds with the CTAB, and screens the positive charge as shown in FIG. 3B. As seen in FIG. 4, due to electrostatic interaction, gold nano-rods 31 covered with CTAB or with CTAB+PAA stay well separated in water 32.

Figure 5A:
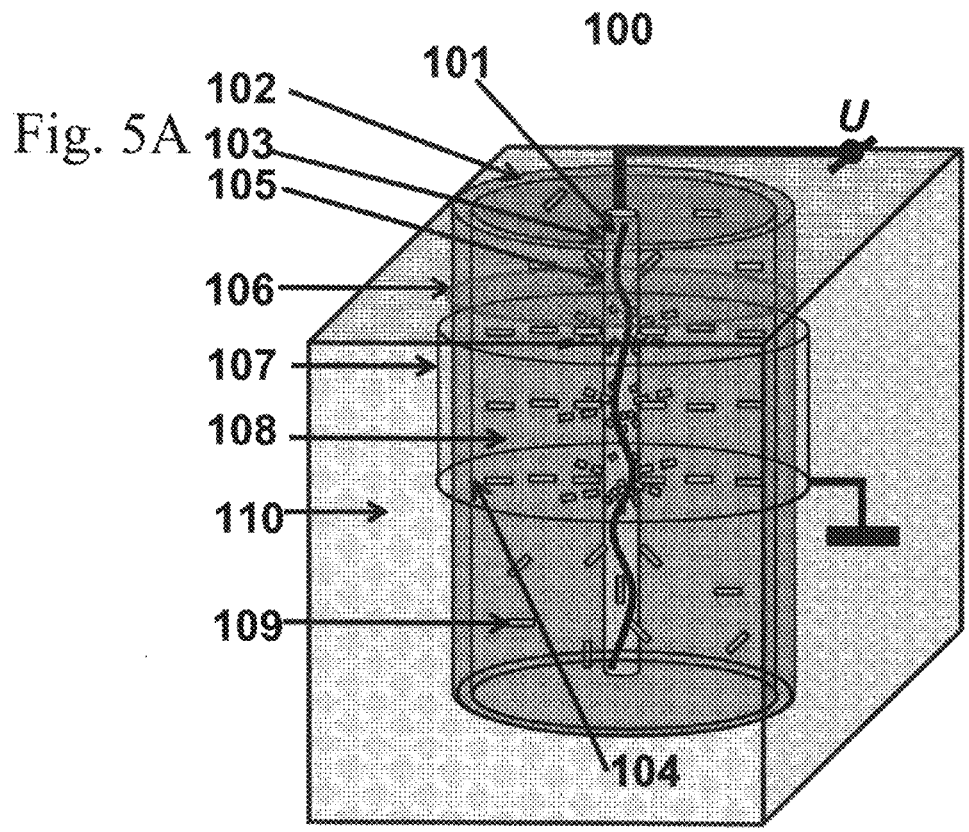
FIG. 5A shows an electro-optical design of cylindrical cloaking shell filled with metal nano-rods dispersed in a dielectric medium according to an example of the invention.

Thereafter, to control the alignment and distribution of the metal nano-particles inside the metamaterial, in examples of the invention, there may be provided two co-axial electrodes to produce a spatially non-uniform electric field in the cavity between electrodes. In an example as shown in FIG. 5, a metamaterial with spatially-varying refractive index 100 may be formed by using a cylindrical shell 102, having an inner surface 104 and an outer surface 106. The shell 102 might be formed from a transparent material such as a borosilicate glass, or other suitable material. In FIG. 5, the shell 102 may be made from a borosilicate glass capillary having a refractive index $n_c=1.5$. A co-axial capillary 103 is centered inside capillary 102. A transparent electrode 107 is provided on or adjacent the outer surface 106. A co-axial electrode 105 is provided on outer surface of the capillary 103. Co-axial capillaries 102 and 103 form a cavity 108 between the co-axial electrode 105 and inner surfaces 104, that is filled with the metal nano-particles 109 dispersed in the dielectric fluid. The inner surface of the capillary 103 surrounds an inner volume in which an object 101 to be cloaked may be positioned. The system of such an example may be used in an environment wherein the surrounding media 110 has a refractive index $n_m=1.5$. The external voltage might be applied to the co-axial electrodes 105 and 107. As an example, to provide co-axial electrodes 105 and 107 the design may include transparent layers of indium tin oxide (ITO) deposited on the capillaries 103 and 102, respectively. In a simplified example that demonstrates the principle of electrically-controlled metamaterial, the inner capillary 103 and the object 101 are replaced with a single element, a metal electrode. The metal electrode serves dual purpose: It provides the means to create a non-uniform electric field and it also serves as the object whose visibility can be changed by redistributing the metal nanoparticles in the medium. Thus, the use of a transparent inner capillary 103 with transparent electrode 105 is optional for the cloak design as shown in FIG. 5. Voltage applied to the co-axial electrodes 105 and 107 produces a non-uniform electric field in the cavity 108 of the cloaking shell 100.

In relation to this example, the alignment and distribution of the metal nanoparticles inside the metamaterial shell 100 is considered in more detail. The metal nanoparticles move and orient because of the so-called dielectrophoretic (DEP) effect in the spatially non-uniform electric field. The applied electric field polarizes the metal nanoparticles; if this field is non-uniform, the induced dipole experiences a force $F_{DEP}$ driving it to the region of a higher field, FIG. 5:

$$F_{DEP} = \gamma \in_m Re[K] \nabla E^2, \qquad (1)$$

where $\gamma$ is the geometrical factor proportional to the volume of particle;

$$Re[K] = Re\left[\frac{\varepsilon_p^* - \varepsilon_m^*}{\varepsilon_m^* + (\varepsilon_p^* - \varepsilon_m^*)\chi}\right]$$

is a real part of frequency- and shape-dependent function of the complex permittivities of particle and medium with complex permittivities $\in_p^*$ and $\in_m^*$, respectively; $\chi$ is the Lorentz depolarization factor that is close to 0 for long cylinders; and E is the applied electric field.

Figure 5B:
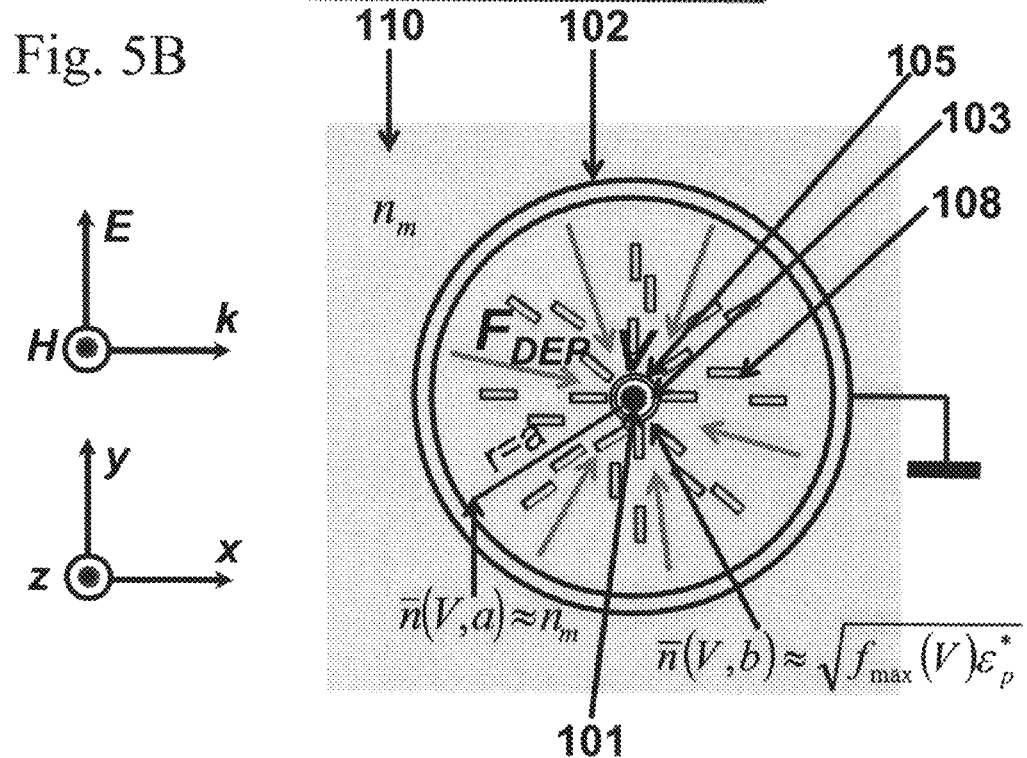
FIG. 5B shows a cross-sectional view of the cylindrical cloaking shell shown in FIG. 5A also with a dielectorphoretic force $F_{DEP}$ exerted on metal nano-rods; wave-vector k, electric field E, and magnetic field H are depicted for light polarized orthogonally to the axis of the cylindrical shell; and X-Y-Z coordinate axes are depicted according to an example of the invention.

The cross-section of the cloak 100 shown in FIG. 5B shows the dielectrophoretic force, $F_{DEP}$, exerted on the metal nano-rods dispersed in dielectric fluid in the cavity 108, where V is the amplitude of applied voltage, $n_m$ is the refractive index of surrounding media, a and b are radii of the outer and inner electrodes, respectively.

All particles, neutral and charged, dielectric and metallic might be affected by DEP force in the presence of a non-uniform electric field. However, the strength of DEP force depends on the shape and size of particles, as well as on the frequency of the electric field. For example, Lorentz depolarization factor $\chi$ is close to 0 for long rods, if these rods are from metal, i.e. conductive material, and if they are dispersed in a dielectric, i.e. poorly conductive media, then $$K = \frac{\varepsilon_p^*}{\varepsilon_m^*} - 1 \sim \frac{\sigma_p}{\sigma_m},$$

where $\sigma_p$ and $\sigma_m$ are electrical conductivities of particle and dielectric medium, respectively. Therefore, K is very large for a highly conductive metal nano-rods dispersed in a low-conductive matrix of the dielectric medium.

Considering the use of rod-shaped metal nanoparticles for example, mixed with a dielectric fluid and filled in between the co-axial electrodes 107 and 105 of the cylindrical metamaterial shell 100. The nonuniform electric field E in the cylindrical geometry is given by the following:

$$E = \frac{V}{r \ln\left(\frac{b}{a}\right)} \hat{r}, \quad (2)$$

where V is potential at the electrode 107, r is the distance of the metal nano-rod's center from the axis of the cylindrical shell, and $\hat{r}$ is the unit radius vector. Consequently, nonuniform electric field produces DEP force on each nano-particle as follows:

$$F_{DEP} = -\gamma \varepsilon_m \frac{2V^2 \sigma_p}{r^3 \left[\ln\left(\frac{b}{a}\right)\right]^2 \sigma_m}, \quad (3)$$

where R and l are the radius and the length of metal nano-rod, respectively.

For metal nano-rods, DEP also creates an orienting torque that keeps the nano-rod's long axes along the radius-vector direction. On one hand, the strength of DEP force is increased toward to the center of the cylindrical shell as $$\frac{1}{r^3}.$$

On other hand, the accumulation of the particles around central electrode 105 is resisted by a steric repulsion and other repulsion forces among nano-rods, entropy effects, etc. Adjusting the amplitude and frequency of the applied electric field, one can create a distribution of the metal nano-rods with a spatially varying concentration, high near the inner electrode 105 and low at the inner surface 104 of the cylindrical shell 102.

The effective dielectric permittivity $\overline{\varepsilon}$ for the mixture of metal nano-rods and dielectric fluid is given by:

$$\overline{\varepsilon}(V,r) = f(V,r)\varepsilon_p^* + (1-f(V,r))\varepsilon_m^*, \quad (4)$$

where f(V,r) is volume filling factor of the metal nano-rods in the mixture, which is a voltage and space dependent parameter due to the DEP effect. For nonmagnetic materials, there is a simple relation between the dielectric permittivity and refractive index at optical frequencies: $n=\sqrt{\overline{\varepsilon}}$. Thus the mixture of metal nano-rods and dielectric fluid also has a voltage and space dependent refractive index:

$$\overline{n}(V,r) = \sqrt{f(V,r)\varepsilon_p^* + (1-f(V,r))\varepsilon_m^*}. \quad (5)$$

It may be expected that after redistribution of the metal nano-rods toward the central electrode 105, the nano-rods would have a maximum volume filling factor around that electrode $f(V,b) \approx f_{max}(V)$. Thus, the effective refractive index of the mixture near the inner electrode is $\overline{n}(V,b) \approx \sqrt{f_{max}(V)\varepsilon_p^*}$. Nano-rods of gold ($\varepsilon_{Au}^* \approx -10+2i$ at wavelength 550 nm) with a volume filling factor $f(V,b) \approx 0.1$ give a very low value of the effective refractive index $\overline{n}(V,b) \approx 0.11$. In contrast, at the surface 104, where the concentration of nano-rods is low, the effective refractive index is close to that one of pure matrix $\overline{n}(V,a) = \sqrt{\varepsilon_m^*}$, for example for a toluene based mixture $\overline{n}(V,a) \approx 1.497$. As a result, the effective refractive index $\overline{n}(V,r)$ would become a function of r, the radial coordinate inside the cloaking shell. This produces a similarity between the desirable structure of ideal theoretically described optical cloak model and the metamaterial structure of the invention. Also, the radial alignment of metal nano-rods may induce an effective birefringence of the metamaterial around central electrode 105.

In an aspect, in relation to the relevant dielectrophoretic force acting on submicron nano-rods, an issue may relate to whether this force would remain strong enough at the scales of interest, because the force is proportional to the volume of particle. In dipole approximation, the dielectrophoretic force is:

$$F_{DEP} \approx \frac{\pi}{8} d^2 l \varepsilon_1 \text{Re}\left\{\frac{\varepsilon_{NR}^* - \varepsilon_t^*}{\varepsilon_t^*}\right\} \nabla |E_{e,rms}|^2,$$

where $\pi d^2 l/8 \sim 10^{-23}$ m³, $\varepsilon_t = 2.4\varepsilon_0$ is the absolute permittivity of toluene, $\varepsilon_0 = 8.854 \times 10^{-12}$ C/(Vm), $$\text{Re}\left\{\frac{\varepsilon_{NR}^* - \varepsilon_t^*}{\varepsilon_t^*}\right\} = \frac{\omega^2(\varepsilon_{NR}\varepsilon_t - \varepsilon_t^2) + (\sigma_{NR}\sigma_t - \sigma_t^2)}{\omega^2 \varepsilon_t^2 + \sigma_t^2}$$

is the real part of the function of complex permittivities $\varepsilon^* = \varepsilon - i\sigma/\omega$ of the NR and the medium (subscripts "NR" and "t", respectively), σ is conductivity, ω=2πf, f is the frequency of the applied electric field. With $\varepsilon_{NR} = 6.9\varepsilon_0$, $\sigma_{NR} = 4.5 \times 10^7$ S/m [19], $\sigma_t \sim 5 \times 10^{-11}$ S/m, f=$10^5$ Hz, one finds $$\text{Re}\left\{\frac{\varepsilon_{NR}^* - \varepsilon_t^*}{\varepsilon_t^*}\right\} \sim 10^7,$$

a huge factor caused predominantly by the differences in conductivities of gold nano-rods and toluene. With typical fields $E_e \sim 10^6$ V/m used in the experiments, and the spatial scale of gradients (10-100) μm, one estimates $F_{DEP} \sim (10\text{-}100)$ pN, a significant force, well above the random forces of Brownian nature, typically estimated as $$F \sim \frac{k_B T}{d} \sim (0.1-1) pN$$

at room temperature T. In these calculations, the role of organic shells around the nano-rods is neglected, such as polystyrene coatings, as their electric properties are close to that of toluene.

The experimental data collected in experiments with samples of the 3D cloaking shells are provided in further Examples. Example 1 and 2 represent data collected in experiments that use a metamaterial shell based on gold nano-rods dispersed in de-ionized water and in toluene. Example 3 serves as a demonstration of an electrically-controlled distribution and alignment of nano-rods in toluene in a non-uniform electric field. In this example, the cell is formed between two flat glass plates and the non-uniform electric field is created between two wire electrodes arranged perpendicularly to each other. This example mimics the effects in the cross-section of a cylindrical metamaterial shell of Examples 1 and 2. Example 4 describes an enhanced visibility of an object placed behind the switchable cloaking shell.

EXAMPLE 1

Figure 6:
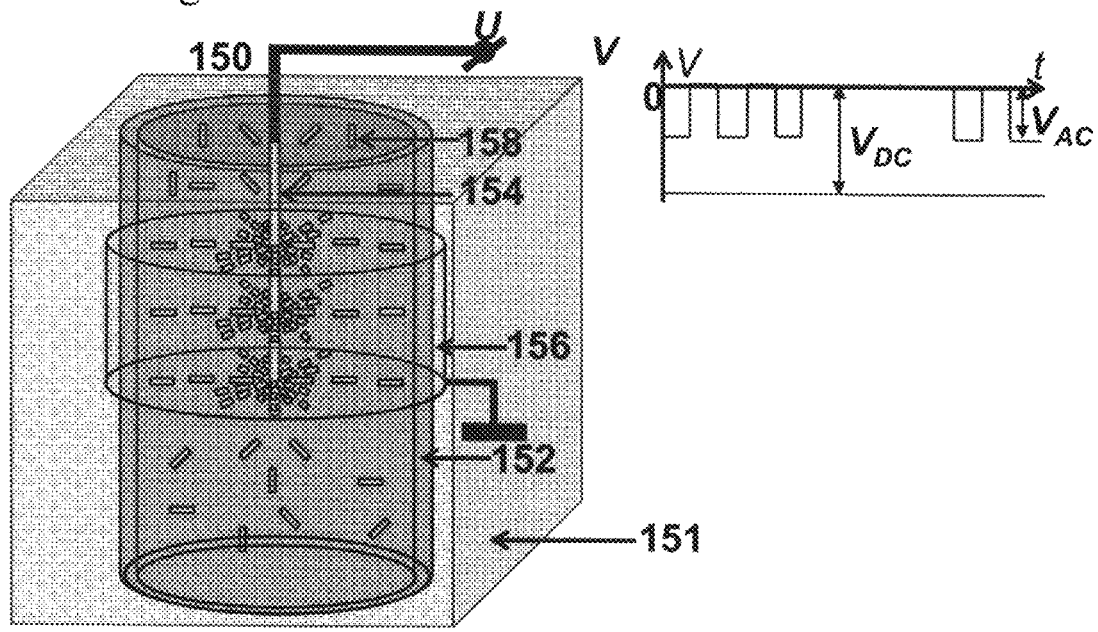
FIG. 6 shows a diagram of a co-axial sample of borosilicate glass capillary with a central micro wire made from copper and gold nano-rods dispersed in water according to an example of the invention.

FIG. 6 depicts a diagram of metamaterial shell 150, wherein the metamaterial shell is assembled by using a borosilicate glass capillary 152 in conjunction with a central copper wire 154, both available from GW Lab, Canoga Park, Calif., USA. The outer diameter of capillary is 40 µm and inner diameter is 14 µm. To provide transparent electrode, the outer surface of capillary was covered with 25 nm thick layer 156 of gold. The copper wire 154 with diameter of 4 micron was centered inside the glass capillary under an optical microscope. The sample was filled with a water based mixture 158 of gold nano-rods by capillary forces. The glass capillary 152 with central electrode 154 and mixture 158 inside was glued between two 1 mm thick microscope glass slide (such as available from Fisher Scientific) by using UV-cured optical adhesive 151 (NOA76 available from Norland, Cranbury, N.J., USA). The sample was placed between parallel polarizer and analyzer of Nikon polarizing microscope Optiphoto2-Pol. The copper wire 154 and transparent electrode 156 were connected to a waveform generator.

Figure 7A:
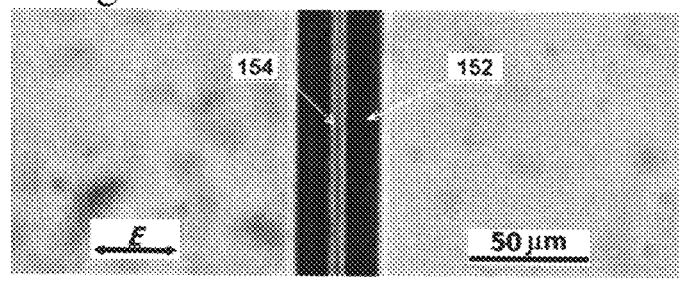
FIG. 7A shows image of the copper wire in the glass capillary arrangement shown in FIG. 6 with no applied voltage according to an example of the invention.
Figure 7B:
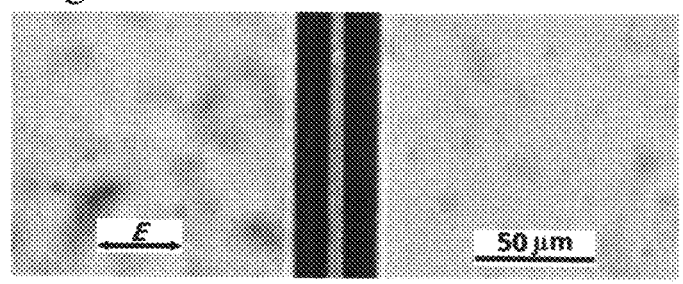
FIG. 7B shows image of the copper wire in the glass capillary arrangement shown in FIG. 6 with applied voltage on according to an example of the invention.

The images of the capillary with central electrode were captured by using a charge-coupled device (CCD) camera (Hitachi HV-C20U-S4) attached to the polarizing microscope. Both images, FIG. 7A and FIG. 7B, were captured in the transmission mode of the microscope with light polarized normal to the axis of the capillary. In FIG. 7A, the image of the central wire 154 is seen inside of the capillary 152. FIG. 7B shows a similar photo to that of FIG. 7A when $50 V_{rms}$ AC voltage on 1 kHz was applied together with −100 V bias DC voltage. Wherein the image of the central wire 154 becomes invisible or at least less visible due to the cloaking effect, FIG. 7B.

EXAMPLE 2

Figure 8:
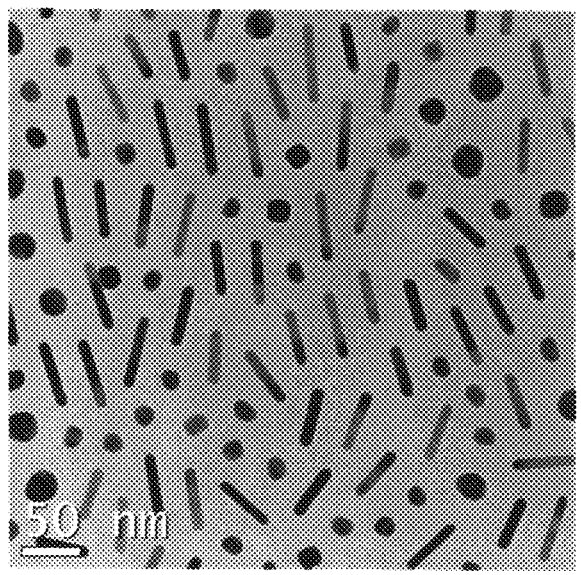
FIG. 8 shows a transmission electron microscope image of dried gold nano-rods according to an example of the invention.
Figure 9:
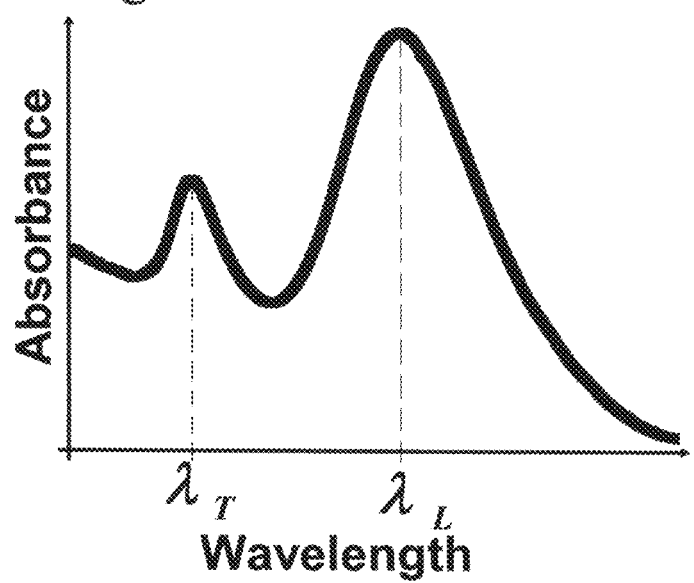
FIG. 9 shows a schematic spectrum of optical absorbance of gold nano-rods according to an example of the invention.

The metamaterial shell may be formed of a metamaterial having metal nanoparticles dispersed in toluene. Toluene is a dielectric fluid with refractive index $n_m \approx 1.497$, thus a toluene based dispersion of gold nano-rods closely matches the refractive index of the borosilicate glass capillary. According to the example, the gold nano-rods are dispersed in toluene to form the mixture. To disperse gold nano-rods in toluene, one may replace the CTAB layer as in the prior example with a layer of thiol terminated polystytren for example, available from Polymer Source Inc., Quebec, Canada. Two samples of the gold nano-rods were prepared: (1) "short" nano-rods with the average length l=50 nm and with the average diameter d=20 nm and (2) "long" nano-rods with l=70 nm and d=12 nm. In an example, FIG. 8 depicts an image of "long" gold nano-rods captured by using a transmission electron microscope after the sample was dried from toluene, layers of thiolterminated polystytren are not seen in the image. Both types of gold nano-rods, "short" and "long", demonstrate longitudinal and transverse plasmons of resonance absorption in visible light caused by absorptions along long and short axes respectively, FIG. 9. For instance, the "short" gold nano-rods demonstrate the longitudinal plasmon at wavelength $\lambda_L \approx 725$ nm and the "long" ones at $\lambda_L \approx 1046$ nm. Both types of the gold nano-rods demonstrate transverse plasmons at $\lambda_T \approx 500$-$550$ nm.

In these examples, the "short" gold nano-rods are well suited to explore the spatial distribution and orientation of nano-rods through light absorption. While the "long" gold nano-rods are better suited to observe cloaking and birefringence effects in the visible part of spectrum. Again, different sizes or shapes of the nano-particles may be used for different applications.

Figure 10:
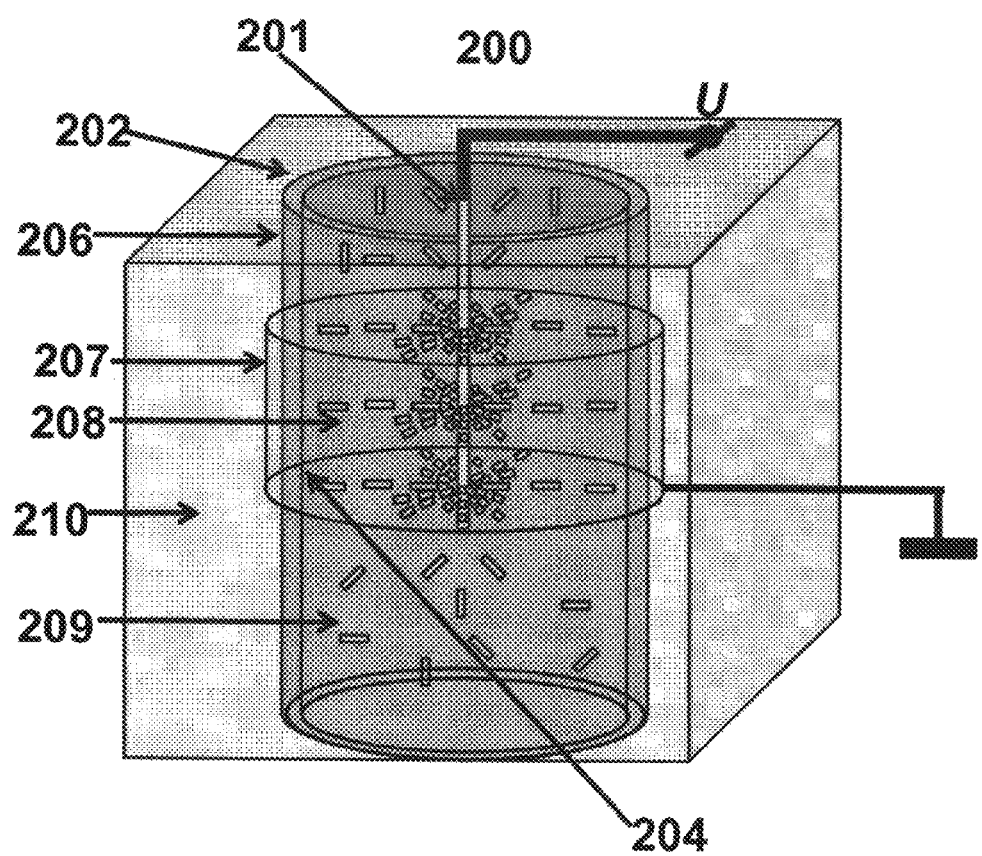
FIG. 10 shows a diagram of sample with a borosilicate glass capillary, a co-axial central wire, and metal nano-rods dispersed in toluene according to an example of the invention.
Figure 11:
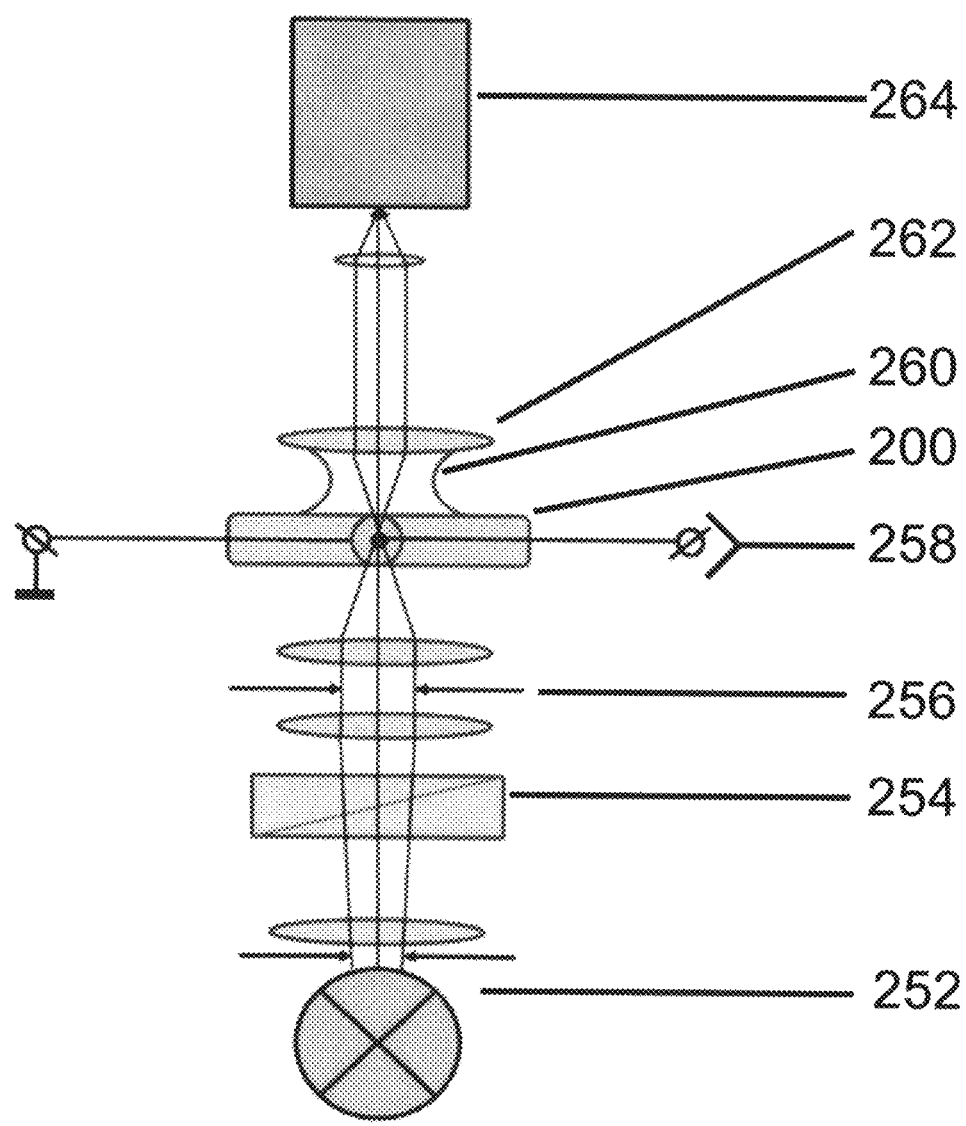
FIG. 11 shows a diagram of optical setup according to an example of the invention.

FIG. 10 depicts diagram of sample 200 filled with "long" gold nano-rods dispersed in toluene. A cavity 208 of is filled with gold nano-rods 209 dispersed in toluene. The electric field is created by co-axial cylindrical electrodes, one being a copper wire 201 of diameter 2a=3 µm running along the axis and the second one formed by a transparent indium tin oxide (ITO) layer 207 deposited on the external surface 206 of the borosilicate glass capillary 202. The glass capillary 202 with central electrode 201 and mixture 209 inside was glued to 1 mm thick microscope glass slide (available from Fisher Scientific) by using UV-cured optical adhesive 210 (NOA76 available from Norland, Cranbury, N.J., USA). The sample was placed between parallel polarizer and analyzer of Nikon polarizing microscope Eclipse E 600 with attached CCD camera 264 Hitachi HV-C20U-S4, with reference to FIG. 11. High resolution images of copper wire in the co-axial capillary were captured by using Nikon objective 262 (Plan Apo 60xA/1.40 Oil, DIC H, /0.17, WD 0.21) and an immersion oil 260 placed in between the sample and objective. Optical setup of the microscope further includes a light source 252 with a field diaphragm, a polarizer 254, and a condenser 256 with an aperture diaphragm. The sample 200 of the glass capillary with co-axial copper micro-wire and the toluene based dispersion of gold nano-rods is positioned as shown in FIG. 11. The sample 200 is connected to a waveform generator by using the connector 258.

In FIG. 10, one can see that the applied voltage V from the waveform generator is applied between the co-axial electrodes 201 and 207. When applied voltage is on, the radial electric field $E_r \propto 1/r$ decreases with the distance r>a from the central wire 201. The AC voltage accumulates and aligns the gold nano-rods near the central electrode 201, (the experimental evidences of this process are available in Example 3, and with reference to FIGS. 14 and 15). The applied AC voltage results in a weak shadow of non-transparent central electrode 201, observed in the orthoscopic mode under the microscope with parallel polarizers, see images of sample captured in a field free state (see FIG. 12A) and in a state with applied voltage $U=170 V_{rms}$, f=100 kHz (FIG. 12B).

Figure 13A:
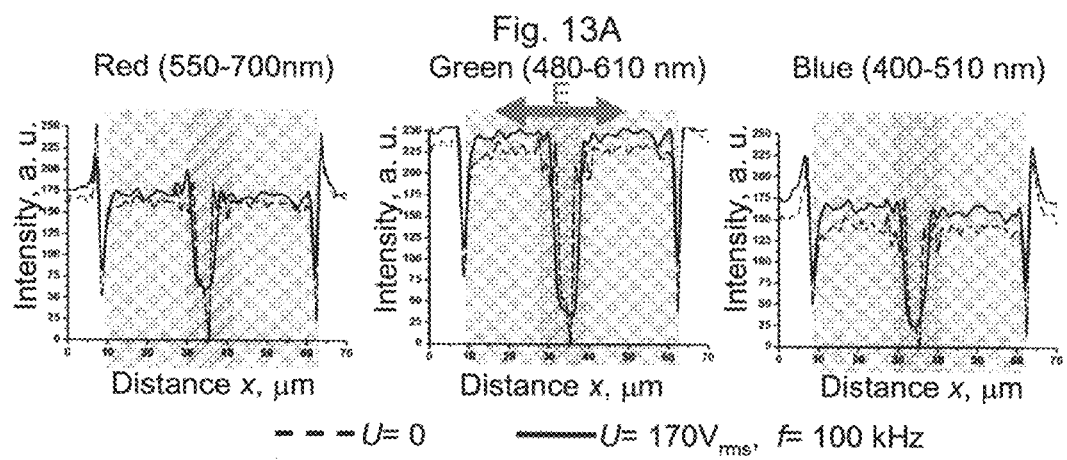
FIG. 13A shows graphs of the intensity of light measured along line OX in FIG. 12, where a probing light is polarized orthogonally to the axis of the capillary according to an example of the invention.
Figure 13B:
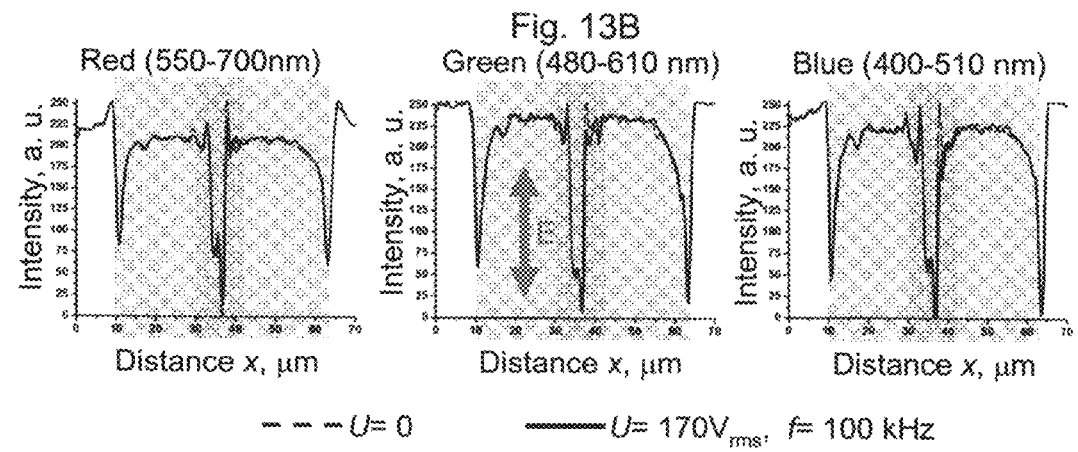
FIG. 13B shows graphs of the intensity of light measured along line OX in FIG. 12, where a probing light is polarized parallel to the axis of the capillary according to an example of the invention.
Figure 14A:
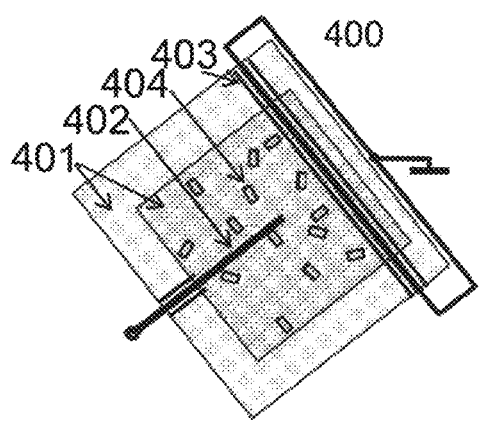
FIG. 14A shows design of a flat cell with a schematic representation of metal nano-rods in a field free state according to another example of the invention.
Figure 14B:
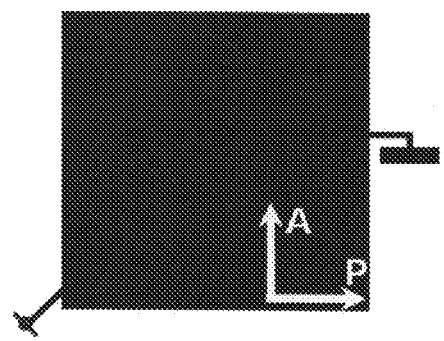
FIG. 14B shows texture of the flat cell filled with toluene based dispersion of gold nano-rods captured in a field free state; the cell was placed between crossed polarizers of a polarizing microscope according to the example of FIG. 14A of the invention.
Figure 14C:
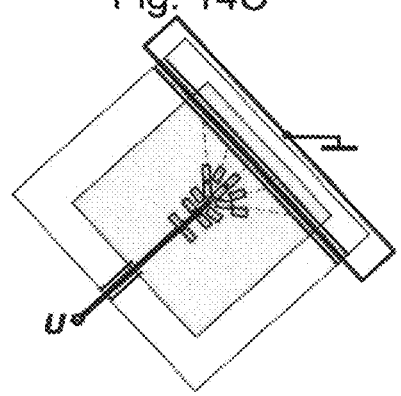
FIG. 14C shows design of a flat cell with schematic representation of metal nano-rods with applied voltage on according to the example of FIG. 14A of the invention.
Figure 14D:
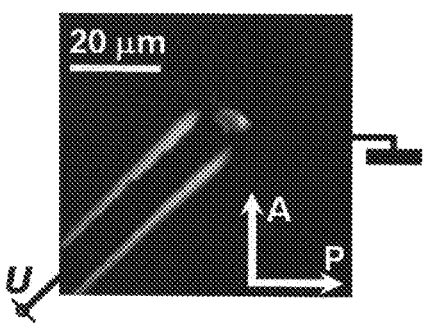
FIG. 14D shows texture of a flat cell filled with toluene based dispersion of gold nano-rods captured when an applied voltage was on; the cell was placed between crossed polarizers of a polarizing microscope according to this example of the invention.
Figure 14E:
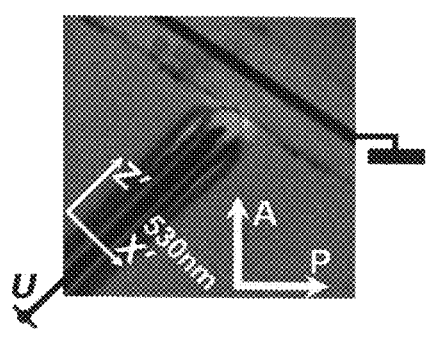
FIGS. 14E and 14F show textures of the flat cell filled with toluene based dispersion of gold nano-rods captured when an applied voltage was on; the cell was placed between the crossed polarizers together with an optical compensator with phase retardation 530 nm according to this example of the invention.
Figure 14F:
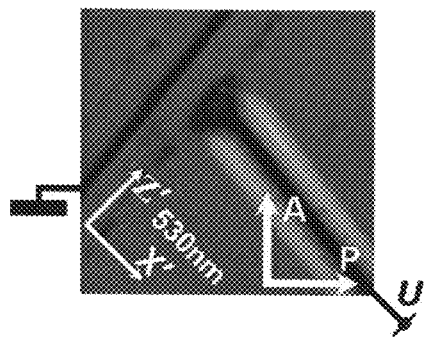

A detail photometry of transmitted lights demonstrated that the cloaking effect is wavelength and polarization dependent. The transmittance profile measured for three spectral regions, "red", "green" and "blue" (the "colors" were decoded from the RGB signal of CCD camera captured along axis OX in FIG. 12) show that the field-induced reduction of the shadow is most pronounced for $\lambda=(550$-$700)$ nm, FIG. 13A (that is in the spectral region where the field-induced birefringence is the highest, FIG. 15F in Example 3). The shadow reduction is most noticeable for light polarized perpendicularly to the capillary, FIG. 13A, and is practically absent for parallel polarization, FIG. 13B.

Reduction of the shadow for light polarized perpendicularly to the capillary represents an "imperfect" version of the cloaking effect considered in Ref. [Cai, W., Chettiar, U. K., Kildishev, A. V. & Shalaev, V. M. *Optical cloaking with metamaterials. Nature Photonics* 1, 224 (2007)]. The local refractive index changes from a smaller value $n_\parallel(x) < n_\perp$ near the central electrode, to a larger value $n_\parallel \approx n_\perp \approx n_t$ at the periphery, where $\Delta n(x)=0$. This index gradient bends the light rays around the electrode, thus reducing its visibility. Propagation of light with parallel polarization is hardly affected by the electric field, FIG. 13B, as the corresponding refractive index $n_\perp \approx n_t$ is practically constant across the capillary.

EXAMPLE 3

To quantify the modifications of local material parameters caused by non-uniform electric field in the metamaterial, one may use a flat cell which would emulate a cross-section of the cylindrical metamaterial shell. The flat cell 400 is formed by two glass plates 401, confining two mutually perpendicular electrodes 402 and 403, with reference to FIGS. 14 and 15. The grounded electrode 403 is a copper wire of diameter 2a=3 μm in a borosilicate glass shell of diameter 20 μm that determines the separation between the glass plates. The second electrode 402 is a similar wire, connected to the waveform generator, with the glass shell etched out along the last portion, about 1 mm long, near the electrode's tip. The cell is filled with the dispersion of gold nano-rods in toluene and sealed.

At zero voltage, the nano-rods are distributed uniformly across the area and show no alignment. In crossed polarizers, the texture is dark, FIG. 14B. When the AC voltage (U=170 $V_{rms}$, frequency f=1 MHz) is applied, the gold nano-rods, being more polarizable than toluene, move into the regions of high electric field. They align, creating an optically birefringent cloud near the electrode 402, see FIG. 14D. By inserting an optical compensator with phase retardation 530 nm, and observing the change of interference colors (red for total, sample+plate, retardation equal 530 nm, yellow for retardation smaller than 530 nm and blue for retardation higher than 530 nm), FIGS. 14E and 14F, one establishes that in the birefringent region, the index of refraction for light polarized perpendicular to the electrode 402 is smaller than for the parallel polarization.

In the regime of parallel polarizers, patterns of the polarization-sensitive longitudinal resonance light absorption for gold nano-rods at wavelength $\lambda=\lambda_L=700$ nm confirm that the electric field accumulates the particles near the electrode and establish that this orientation is radial, i.e., perpendicular to the electrode 402, FIGS. 15A and 15B. To characterize the concentration variation along the axis x crossing the electrode 402 near its tip, FIG. 15A, we measured the transmittance $T_\parallel$ of linearly polarized (along x) light as a function of x, FIG. 15C. $T_\parallel$ was normalized by the sample transmittance far away from the electrodes, at zero voltage. The wavelength was chosen at 460 nm, for which the anisotropy of light absorption is small, FIG. 15E, so that the variation in transmission is determined mostly by the concentration gradients. Near the vertical electrode 402, light transmittance is reduced when the voltage is on, FIGS. 15C and 15D, confirming accumulation of nano-rods. We determine the ratio $$k(x) = \frac{\eta_U(x)}{\eta_0} = \frac{\ln T_\parallel(x)}{\ln T_{\parallel,0}}$$

as the measure of how much the local filling factor $\eta_U(x)$ of gold nano-rods in the gradient field is larger than the filling factor $\eta_0$=Const in zero field. The maximum k is ~20, corresponding to $\eta_U$~0.01-0.02, FIG. 15D.

While light absorption discussed above is helpful to trace the field-controlled distribution of nano-rods, the optical parameter of interest is the refractive index and whether it changes in space. Presence of metallic nano-rods in a dielectric can dramatically reduce the refractive index, even make it negative, thus enabling a negative refraction of light. In cloaking applications, the negative values are not needed, but the refractive index should change in space. In the aligned assembly of gold nano-rods, the refractive index is anisotropic, i.e. dependent on whether the light polarization is parallel ($n_\parallel$) or perpendicular ($n_\perp$) to the alignment director of gold nano-rods. In the flat cell, we find that birefringence $\Delta n = n_\parallel - n_\perp$ is negative, FIG. 14. As shown below, the absolute value $|\Delta n|$ reaches its maximum, $|\Delta n_{max}|$, in the region with the highest concentration of nano-rods near the electrode 402.

To estimate $\Delta n_{max}$, we selected a small circular region of diameter 5 μm centered at the point of the maximum k(x) and measured transmission of light polarized parallel to the x axis ($T_\parallel$), perpendicular to it ($T_\perp$) and at the angle of 45 degrees ($T_{45}$), as the function of λ, FIG. 15E. With a simplifying assumption that the nano-rods are aligned in the plane of cell, the phase retardation is determined in a similar way described in Ref. [Nastishin, Yu. A. et al. *Optical characterization of the nematic lyotropic chromonic liquid crystals: Light absorption, birefringence, and scalar order parameter. Phys. Rev. E* 72, 041711 (2005)]:

$$\Phi \approx \frac{\lambda}{2\pi} \cdot \cos^{-1} \frac{4T_{45} - (T_\parallel + T_\perp)}{2\sqrt{T_\parallel T_\perp}}.$$

The wavelength-dependent Φ is significant, reaching (−190) nm at 650 nm, FIG. 15F. By approximating the measured Φ as $h\Delta n_{max}$, where h≈(2-4) μm is the effective pathway of light, one estimates $\Delta n_{max}$~Φ/h~−(0.1÷0.05) at λ=650 nm. The latter value is comparable to birefringence of thermotropic liquid crystals. However, the most important feature is that $\Delta n(x)$ depends strongly on the x-coordinate perpendicular to the electrode. When the electric field is on, $\Delta n(x)$ changes from $\Delta n_{max}$~−(0.1÷0.05) near the electrode to $\Delta n=0$ within a distance of ~5 μm from the electrode (in zero field, $\Delta n=0$ everywhere), FIG. 15D. The gradients of the refractive index are sufficient to cause experimentally observed optical effects in the cylindrical metamaterial shell.

The values of Δn reflect the cumulative effect of gold nano-rods and their aggregation-preventing polystyrene (PS) coatings. The contribution of gold nano-rods can be roughly estimated from an effective refractive index of toluene-gold nano-rods dispersion, $n_\parallel^2 \approx (1-\eta_U)n_t^2 + \eta_U n_{NR}^2$, where $n_{NR}^2$ is the (real part of) dielectric permittivity of gold at optical frequencies. For $\eta_U$≈0.01-0.02 and $n_{NR}^2$≈−20 at 700 nm, one finds $n_\parallel$≈1.34-1.42 and thus the contribution of gold nano-rods alone can lead to $\Delta n_{max}$≈−(0.16÷0.09). The contribution of PS can somewhat enhance or diminish this effect, depending on whether the PS chains are aligned mostly perpendicular or parallel to the nano-rods, as the refractive index along the PS chain is smaller than in perpendicular direction. Birefringence of mechanically stretched PS is $|\Delta n_{PS}|$≈0.0006 at 700 nm. If we assume that in the flat cell the entire 20 μm gap is filled with such a birefringent PS, its phase retardation would contribute only about 12 nm to the total retardation, which is about one order of magnitude larger, according to the experimental Φ in FIG. 15F. It suggests that the main contribution to the electric field-induced gradient of the refractive index is caused by the gold nano-rods rather than by their coatings.

EXAMPLE 4

Optical cloaking permits an observation of object placed behind nontransparent copper wire used as central electrode in cylindrical metamaterial shell. For example, FIG. 16 presents the effect of enhanced visibility of an object placed behind the switchable metamaterial. The object 300 is a stripe pattern of a cured photoresist Shipley S1818 on a flat glass plate. The capillary 302 with toluene dispersion of gold nano-rods and central electrode 303 is placed directly on top of it. At zero voltage, the central electrode 303 blocks the image of the stripes 301 beneath it. However, once the field is applied to decrease the refractive index near the central electrode 303, the visibility of stripes is enhanced, as evidenced by the profile of light transmittance along the center of electrode 303, FIGS. 16B and 16C. Similarly to the examples in FIGS. 6 and 10, the gradient refractive index bends the optical rays around the obstacle (the central electrode 303), reducing its shadowing effect on the image of stripes 301.

Therefore, based on the examples as described, metamaterials with spatially varying refractive index may be provided wherein the application of at least one electric field is used to reconfigure nano-particles dispersed in a dielectric fluid. The nano-size metal particles and the ability to configure them in a desired manner in the dispersion, provide the ability to control refractive characteristics of the material, and produce a spatially varying refractive index for use in cloaking devices, or to control light via a lens type configuration, or in other optical applications. As previously described, although various examples deal with rod or prismatic shape of gold nanoparticles, other shapes and/or sizes may be used as well. Similarly, although examples of gold nano-rods are described, other noble metals of a low dielectric permittivity and high electrical conductivity may be used, or other suitable materials may be used. The soft matter dielectric materials may be fluids of low dielectric permittivity and low electrical conductivity, such as deionized water, toluene, oil, glycerine, thermotropic liquid crystal, lyotropic liquid crystal, polymer, elastomer, or other suitable fluids. Though the use of the mixtures are described in conjunction with a glass capillary formed as a shell to encompass an object or volume to be concealed by a cloak, such material may be used in a lens type configuration, wherein applied electric fields may be used to control the dispersion of the nanoparticles in the lens to control and vary refractive properties thereof. Other optical devices are also contemplated.

Although the invention has been shown and described in conjunction with examples thereof, the same are considered as illustrative and not restrictive, and that all changes and modifications that come within the spirit of the invention described by the following claims are within the scope thereof.

What is claimed is:

1. A method for electrically controlling an optical metamaterial comprising:
   (a) providing a metamaterial comprising a dispersion of metal nanopaticles in a dielectric material;
   (b) providing a body member having a cavity;
   (c) introducing the metamaterial into the cavity in a manner that the particles are dispersed throughout the cavity; and
   (d) applying at least one spatially non-uniform electric field in a region of the body member to control an alignment and a distribution of the metal nanoparticles in the metamaterial to create a spatially-varying refractive index in the metamaterial in the cavity wherein the application of the at least one electric field reconfigurably distribute the metal nanoparticles of a particular shape in space.

2. The method of claim 1, further comprising selectively changing the frequency and/or amplitude of applied at least one electric field.

3. The method of claim 1, further comprising functionalizing the nanoparticles mixed with the dielectric material.

4. The method of claim 3, wherein the step of functionalizing the nanoparticles prevents aggregation of the metal nanoparticles in the dielectric material.

5. The method of claim 1, further comprising enclosing the cavity to avoid evaporation of the dielectric material.

6. The method according to claim 1, wherein the body is formed of a transparent material and a wavelength of passing light is larger than size of the metal nano-particle.

7. The method according to claim 1, further comprising at least one external electrode and at least one internal electrode which create the at least one non-uniform electric field across the cavity.

8. The method according to claim 7, wherein the body member is formed of a transparent material and the at least one external electrode is provided on the exterior of the body member and is transparent.

9. The method according to claim 1, wherein the applied at least one non-uniform electric field modifies one or more local material parameters of the metamaterial in the cavity selected from the group consisting of dielectric permittivities, refractive indices, and concentration of the metal nanoparticles or combinations thereof.

10. The method according to claim 1, wherein the body member comprises inner and outer surfaces defining the cavity.

11. The method according to claim 10, further comprising positioning an object interior to the inner surface of the body member, and application of the electric field causes cloaking of the object.

12. The method according to claim 11, wherein the object inside of the body member is larger than wavelength of passing light.

13. The method according to claim 1, wherein the metal nanoparticles in the dielectric material are electrically charged.

14. The method according to claim 1, wherein the metal nanoparticles in the dielectric material are electrically neutral.

15. A cloaking apparatus, comprising:
a structure formed of a transparent body having a cavity with a metamaterial provided in the cavity, the metamaterial being a mixture of at least one dielectric fluid and a plurality of metal nanoparticles, with inner and outer electrodes and a voltage source to selectively produce at least one spatially non-uniform electric field across at least a portion of the metamaterial that controls the alignment and distribution of the metal nanoparticles to create a spatially-varying refractive index in the metamaterial, wherein the application of the at least one non-uniform electric field reconfigurably distributes at least a portion of the metal nanoparticles of a particular shape in space such that the effective index of refraction creates an optical cloak around the predetermined pattern with predetermined optical properties spatially non-uniform electric field in the region of the body member to control the alignment and distribution of the metal nanoparticles in the metamaterial to create a spatially-varying refractive index in the metamaterial in the cavity wherein the application of the at least one electric field reconfigurably distributes the metal nanoparticles of a particular shape in space such that the effective index of refraction creates a predetermined pattern with predetermined optical properties.

16. The apparatus of claim 15, wherein the structure is disposed between an object and an observer.

17. The apparatus of claim 15, wherein the structure is a shell that has an inner surface and an outer surface such that an object is disposed interior to the inner surface shell.

18. The apparatus of claim 15, wherein the properties of the metamaterial are reconfigurable to reduce the backscattering coefficient and the forward scattering coefficient of a combination of the structure and an object disposed relative to the structure such that the structure is disposed between the object and a source of electromagnetic radiation.

19. The apparatus of claim 15, wherein the applying at least one electric field modifies one or more local material parameters of the metamaterial in the cavity selected from the group consisting of dielectric permittivities, refractive indices, and concentration of the metal nanoparticles or combinations thereof.

20. The apparatus of claim 15, wherein the structure has a cylindrical symmetry, and an inner void.

21. The apparatus of claim 20, wherein an object is disposed in the inner void.

22. A method of cloaking an object, the method comprising:
providing a structure having a cavity in which a metamaterial formed of a plurality of metal nanoparticles disposed in a dielectric material in a manner to allow the metal nanoparticles to move within the dielectric material,
providing a system for generating at least one spatially non-uniform electric field in at least a portion of the metamaterial,
disposing the object to be cloaked interior of the cavity such that the structure is positioned between the object and an observer, and selectively applying the at least one non-uniform electric field to control the alignment and distribution of the metal nanoparticles to create a spatially-varying refractive index in the metamaterial such that the metamaterial has a dielectric permittivity that varies.

23. The method of claim 22, wherein the metamaterial comprises a plurality of metal nano particles of at least one shape which are dispersed in the dielectric medium.

24. The method of claim 23, wherein the metal nano particles are formed of at least one noble metal of a low dielectric permittivity and high electrical conductivity.

25. The method of claim 24, wherein the at least one noble metal is selected from the group consisting of gold, silver, platinum or combinations thereof.

26. The method of claim 22 wherein the dielectric material is a dielectric fluid selected from the group consisting of water, toluene, oil, glycerine, thermotropic liquid crystal, lyotropic liquid crystal, polymer, elastomer, and combinations thereof.

27. The method of claim 22 wherein the surface of the nanoparticles is functionalized to prevent their aggregation.

28. The method of claim 27, wherein the surface is functionalized using materials selected from the group consisting of surfactants, polymers or combinations thereof.

29. The method of claim 22, wherein the application of at least one non-uniform electric field causes effects including aligning the metal nanoparticles with respect to the direction of the applied electric field and redistributing the nanoparticles in space to make their local concentration position dependent.

30. The method of claim 29, wherein the effects modify the local value of the dielectric permittivity of the composite metamaterial, thereby modifying its effective optical refractive index or indices.

31. The method of claim 22, further comprising selectively causing the refractive indices of the material to be made permanent after application of the at least one electric field.

32. An optical apparatus comprising
a structure formed of a transparent body having a cavity with a metamaterial provided in the cavity, the metamaterial being a dispersion of at least one dielectric fluid and a plurality of metal nanoparticles, wherein the metal nanoparticles are comprised of rod-shaped nanoparticles,
inner and outer electrodes and a voltage source to produce at least one electric field across the metamaterial in the cavity, a voltage driver to create a non-uniform electric field wherein application of the non-uniform electric field controls the alignment and distribution of the metal nanoparticles to create a spatially-varying refractive index in the metamaterial and allows reconfiguration of the properties of the metamaterial.

33. The optical apparatus of claim 32, wherein the voltage driver is operated to application of at least one cause effects including aligning the metal nanoparticles with respect to the direction of the applied electric field and redistributing the nanoparticles in space to make their local concentration position dependent.

34. The optical apparatus of claim 33, wherein the rod-shaped nanoparticles are selected from a group consisting of short rod-shaped nanoparticles, long rod-shaped nanoparticles, and combinations thereof.

35. The optical apparatus of claim 32, wherein the voltage driver is operated to modify one or more local material parameters of the metamaterial in the cavity selected from the group consisting of dielectric permittivities, refractive indices, alignment or concentration of the metal nanoparticles or combinations thereof.

* * * * *